United States Patent
Ye et al.

(10) Patent No.: US 11,485,799 B2
(45) Date of Patent: Nov. 1, 2022

(54) ULTRASONIC-ASSISTED METHOD OF EXTRACTING A PECTIN RICH IN RG-I

(71) Applicant: ZHEJIANG UNIVERSITY, Hangzhou (CN)

(72) Inventors: Xingqian Ye, Hangzhou (CN); Weiwei Hu, Hangzhou (CN); Shiguo Chen, Hangzhou (CN); Huan Cheng, Hangzhou (CN); Donghong Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 116 days.

(21) Appl. No.: 17/267,489

(22) PCT Filed: Dec. 3, 2019

(86) PCT No.: PCT/CN2019/122629
§ 371 (c)(1),
(2) Date: Feb. 9, 2021

(87) PCT Pub. No.: WO2021/108979
PCT Pub. Date: Jun. 10, 2021

(65) Prior Publication Data
US 2022/0112313 A1     Apr. 14, 2022

(51) Int. Cl.
*C08B 37/00*     (2006.01)

(52) U.S. Cl.
CPC .................. *C08B 37/0045* (2013.01)

(58) Field of Classification Search
CPC ................. C08B 37/0045; C08B 37/0048
USPC ............................................. 526/2
See application file for complete search history.

(56) References Cited

FOREIGN PATENT DOCUMENTS

CN     107141369 A   *   8/2017       C08B 37/0045

\* cited by examiner

*Primary Examiner* — Ganapathy Krishnan

(57) ABSTRACT

The present disclosure discloses an ultrasonic-assisted method of extracting a pectin rich in RG-I. The method includes: (1) dispersing citrus peel powders in an alkaline solution containing sodium borohydride; (2) placing a solution obtained in step (1) in a water bath of 25 to 40° C., and performing an ultrasonic treatment on the solution obtained in step (1); (3) centrifuging the solution subjected to step (2) at a speed of 6000-8000 rpm to remove residues, retaining a supernatant, and precipitating a pectic polysaccharide with absolute ethanol; and (4) adding water to the pectic polysaccharide precipitant subjected to step (3) to obtain a redissolved solution, transferring the solution to a dialysis bag with a molecular weight cut-off of 3000 to 3500 Da, dialyzing for 48 hours, and freeze-drying in a vacuum freezer to obtain the pectin rich in RG-I.

5 Claims, 1 Drawing Sheet

ULTRASONIC-ASSISTED METHOD OF EXTRACTING A PECTIN RICH IN RG-I

FIELD

The present disclosure relates to an ultrasonic-assisted method of extracting a pectin rich in RG-I, in particular to a method for extracting a pectic polysaccharide rich in RG-I based on an ultrasonic-assisted technology, which belongs to the technical field of functional sugar.

BACKGROUND

Pectin, an important polysaccharide component in the primary cell walls and mesotheliums of land plants, has many functional characteristics and is widely used in food, medicine and cosmetics industries. The main structures of the pectin include polygalacturonan (HG), rhamnogalacturonan I (RG-I), and a small amount of rhamnogalacturonan II (RG-II). Among them, RG-I pectin refers to a pectic polysaccharide mainly composed of RG-I domains, which is abundant in the processing waste of fruits and vegetables. However, researchers have rarely studied the structure and functions of the RG-I pectin, which is mainly because in the traditional industry the RG-I pectin is considered to be a gel blocking factor. In order to obtain pectin with uniform quality and good gelling property, producers usually use strong acid and high temperature to treat raw materials, which may degrade the side chains of the pectin. And the obtained commercial pectin is usually mainly composed of HG structures, with less RG-I structure.

Recent studies have shown that the RG-I pectin has biological activities such as beneficial to gut health and regulating chronic metabolic syndrome, and its RG-I domains can block the recognition of galectin-3 (Gal-3) with other proteins and peptides by combining with Gal-3, and can inhibit processes of cell adhesion and apoptosis, thus preventing cancer and cardiovascular diseases better. And RG-I pectin can form sugar-free gel by pH induction, microwave induction and so on. In view of its potential biological activity and unique application prospect, the RG-I pectin should be retained, extracted, developed and utilized.

At present, the method for extracting RG-I pectin mainly includes extracting polysaccharides from plant cell walls layer by layer. In order to improve the extracting efficiency of pectin and reduce the use of chemicals, it is very important to study new technical methods to extract RG-I pectin efficiently.

SUMMARY

The purpose of the present disclosure is to address the deficiencies of the existing art, and to provide a method for extracting pectin rich in RG-I. The method supplemented by ultrasound uses an alkaline system as an extracting solvent at room temperature, which promotes an extracting rate of pectin and prevents a hydrolysis of the side chains of pectin during the extracting process. After the alcohol precipitation, dialysis and drying, the pectin rich in RG-I domains is obtained.

The purpose of the present disclosure is realized by the following technical solutions:

an ultrasonic-assisted method of extracting a pectin rich in RG-I, including:

(1) dispersing citrus peel powders in an alkaline solution containing sodium borohydride;

(2) placing a system obtained in step (1) in a water bath of 25 to 40° C., and performing an ultrasonic treatment on the system obtained in step (1);

(3) centrifuging the system subjected to step (2) at a speed of 6000-8000 rpm to remove residues, retaining a supernatant, and precipitating a pectic polysaccharide with absolute ethanol; and (4) adding pure water to the pectic polysaccharide precipitant subjected to step (3) to obtain a redissolved solution, transferring the solution to a dialysis bag with a molecular weight cut-off of 3000 to 3500 Da, dialyzing for 48 hours, and freeze-drying in a vacuum freezer to obtain the pectin rich in RG-I.

Furthermore, in step (1), the citrus peel powders are mixed with the alkaline solution according to a solid-liquid ratio of 1:50 g/mL, and an alkali in the alkaline solution is sodium hydroxide or potassium hydroxide with a concentration of 0.05 to 0.1 mol/L, and a concentration of sodium borohydride is 20 to 50 mmol/L.

Furthermore, in step (2), an ultrasonic time is 20 to 40 min, and an ultrasonic intensity is 0.5 to 3.5 W/mL.

Furthermore, a centrifuging time in step (3) is 20 to 30 min.

Furthermore, the pectic polysaccharide precipitant in step (4) is washed with absolute ethanol for 2 to 3 times.

The beneficial effects of the present disclosure include: the ultrasonic-assisted method for extracting the pectin rich in RG-I provided by the present disclosure has mild extracting conditions and retains neutral sugar side chains, thereby obtaining pectic polysaccharides with a high proportion of RG-I domains. Compared with an existing art, the extracting process is simple, the extracting time is short, and the extracting rate is high. The obtained pectin has a richer functionalized structural domains and has an important industrial application value.

DETAILED DESCRIPTION OF THE EMBODIMENTS

Figure 1:
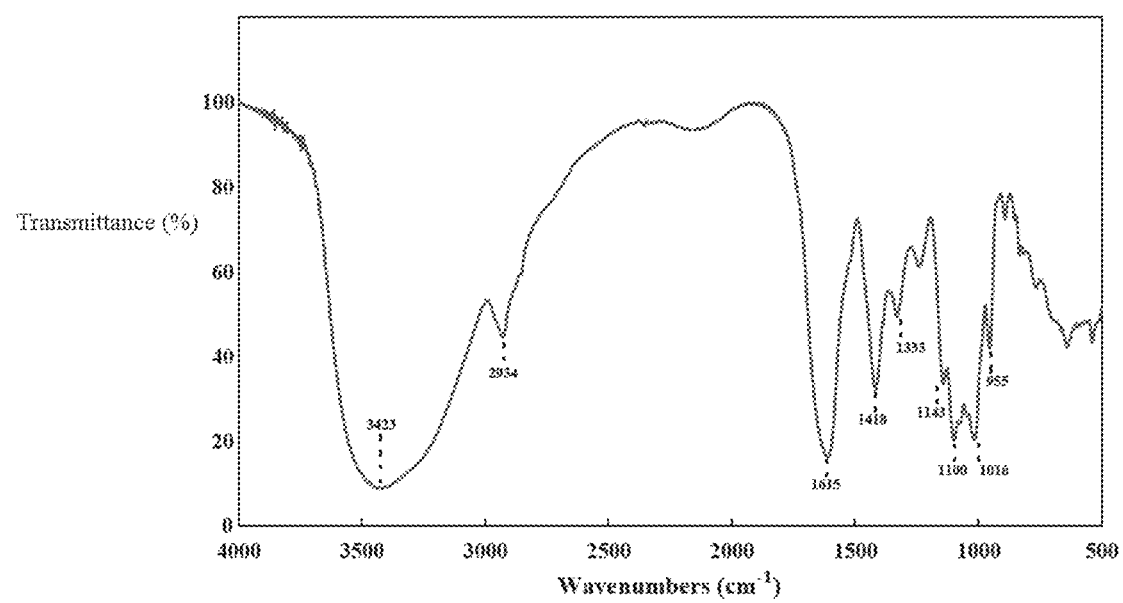
FIG. 1 is a near-red spectrum of embodiment 1.

The present disclosure will be further described in detail below in conjunction with embodiments, but the implementations of the present disclosure are not limited thereto.

Embodiment 1

After drying and grinding citrus peel, 0.7 g citrus peel powders were mixed with 50 mmol/L sodium hydroxide solution containing 20 mmol/L sodium borohydride according to a solid-liquid ratio of 1:50 g/mL, then the obtained system was placed in a constant temperature water bath of 25° C. for an ultrasonic treatment. The ultrasonic treatment conditions are: ultrasonic intensity 1.43 W/mL, ultrasonic temperature 25° C., ultrasonic volume 35 mL, and ultrasonic time 20 min. The ultrasonic treated system was centrifuged at a speed of 6000 rpm for 20 min at room temperature, and 31 mL of supernatant was obtained after removing the residue. The supernatant was added to absolute ethanol 4 times the volume of the supernatant to precipitate the pectic polysaccharide. Further, the pectic polysaccharide was washed twice with absolute ethanol and redissolved with deionized water, the redissolved pectic polysaccharide solution was transferred to a dialysis bag with a molecular weight cut-off of 3500 Da, dialyzed in pure water for 48 h, and dried in a vacuum freezer to obtain 0.125 g of dry pectic polysaccharide powder. The yield was 20.16% calculated according to the following formula:

$$Y = \frac{m_1}{M} \times \frac{V}{V_f} \times 100\%$$

Y (%) is the yield of pectic polysaccharide, ml (g) is a mass of pectic polysaccharide, M (g) is a mass of citrus peel powders, V (mL) is a volume of ultrasonic treated system, and Vf (mL) is a volume of supernatant after centrifugation.

The properties and structure of pectic polysaccharide were determined:

Molecular Weight

Pectic polysaccharide was dissolved in deionized water to obtain a solution with a concentration of 3 mg/mL, and the solution was injected into SEC-MALLS-RI (Wyatt Dawn Heleos-II, USA) system for detection after passing through a 0.22 μm water film. An injection volume was 50 μL, an analytical column was Shodex SB-804/806 (Showa Denko KK, Japan), a mobile phase was 0.15M sodium chloride solution, a flow rate was 0.5 mL/min, dn/dc=0.088 mL/g. A weight-average molecular weight of the pectic polysaccharide was measured to be 438 KDa, a number average molecular weight of the pectic polysaccharide was measured to be 161 KDa, and the dispersibility of the pectic polysaccharide was measured to be 2.71.

Composition of Monosaccharide

Pectic polysaccharide was dissolved in deionized water to prepare a solution with a concentration of 2 mg/mL, 1 mL of 4M tetrafluoroacetic acid was added to the solution to acquire a mixture, the mixture was hydrolyzed at 110° C. for 8 hours, then cooled to the room temperature, and 1 mL of methanol was added into the mixture, then the mixture was dried by nitrogen. 10 mL of deionized water was added into the dried product to acquire a mixture, the mixture was injected into the ICS-5000 (Thermo Fisher, USA) system for detection after passing through the 0.22 μm water membrane. The injection volume was 25 μL, the analytical column was CarboPac PA10 Analytical (Thermo Fisher, USA), the mobile phase A was 18 mM sodium hydroxide solution, and the mobile phase B was 100 mM sodium acetate solution containing 15 mM sodium hydroxide, the flow rate was 1 mL/min. In a gradient mode, the time gradient was 0 min→15 min→35 min, and the corresponding concentration gradient was 0→100% mobile phase A→100% mobile phase B.

As shown in Table 1, the acidic sugar in pectic polysaccharide is mainly galacturonic acid with a content of 36.16%. A content of neutral sugar in pectic polysaccharide is relatively high, and the neutral sugar is mainly arabinose. HG % and RG-I % in pectic polysaccharide were calculated according to the following formula. The results show that the HG mole percentage of the pectin manufactured at a low temperature under the assistance of ultrasound is 33.38%, and the RG-I mole percentage of the pectin manufactured at a low temperature under the assistance of ultrasound is 61.07%, which indicating that the pectic polysaccharide is mainly composed of RG-I domain, a ratio of a sum of contents of arabinose and galactose to a content of the rhamnose is 19.96, indicating that the pectic polysaccharide has a higher degree of branching.

HG %=GalA %-Rha %

RG-I %=GalA %-HG %+Rha %+Gal %+Ara %

Infrared Spectrum 1

The infrared spectrum of the pectic polysaccharide was analyzed by Nicolet iN10 (Thermofisher, USA). The analysis steps include: mixing 1 mg pectic polysaccharide sample with 200 mg potassium bromide powders, grinding and tabletting the mixture, then performing an infrared spectrum scanning on the mixture with a scanning frequency ranging from 400 $cm^{-1}$ to 4000 $cm^{-1}$.

FIG. 1 shows the near red spectrum of pectic polysaccharide. As shown in FIG. 1, the absorption peak near 3423 $cm^{-1}$ is mainly caused by 0-H stretching vibration, while the absorption peak at 2934 $cm^{-1}$ is caused by C—H stretching vibration of $CH_2$ group. The absorption peak at 1615 $cm^{-1}$ is attributed to the C=O stretching vibration of free carboxyl group. Generally, a ratio of a peak area at 1745 $cm^{-1}$ (COO—R) to a sum of peak areas at 1743 $cm^{-1}$ (00-R) and 1615 $cm^{-1}$ (COO—) is defined as a degree of esterification. It can be seen from FIG. 1 that the degree of esterification of pectic polysaccharide is low. In addition, the absorption peak between 800-1200 $cm^{-1}$ is complex, which is called a fingerprint region.

Determination of an Affinity Between Pectic Polysaccharide and Galectin-3

The affinity between pectic polysaccharide and galectin-3 was determined by surface plasmon resonance BIAcore 3000 (GE Healthcare, USA). The analysis steps include a step of manufacturing chip, including: providing a CM-5 chip, activating the chip with (3-dimethylaminopropyl)-3-ethyl carbonimide hydrochloride and N-hydroxysuccinimide, sampling Gal-3 after activation, finally sealing the chip with ethanolamine. A first channel of the chip was a control channel without Gal-3. Steps to test the sample include: dissolving pectic polysaccharide in HBS-EP buffer solution, and preparing pectic polysaccharide samples with concentrations of 6.7 μM, 3.4 μM, 1.7 IM, 0.84 μM and 0.42 μM;

TABLE 1

Composition of Monosaccharide of the pectic polysaccharide

| Type | Rhamnose (Rha) | Arabinose (Ara) | galactose (Gal) | Glucose (Glu) | Xylose (Xyl) | GalA (galacturonic acid) |
|---|---|---|---|---|---|---|
| Content (mol %) | 2.78 | 43.22 | 12.29 | 3.01 | 2.54 | 36.16 | sequentially injecting samples according to a concentration gradient, with an injecting volume of 90 μL and a test temperature of 25° C.

Figure 2:
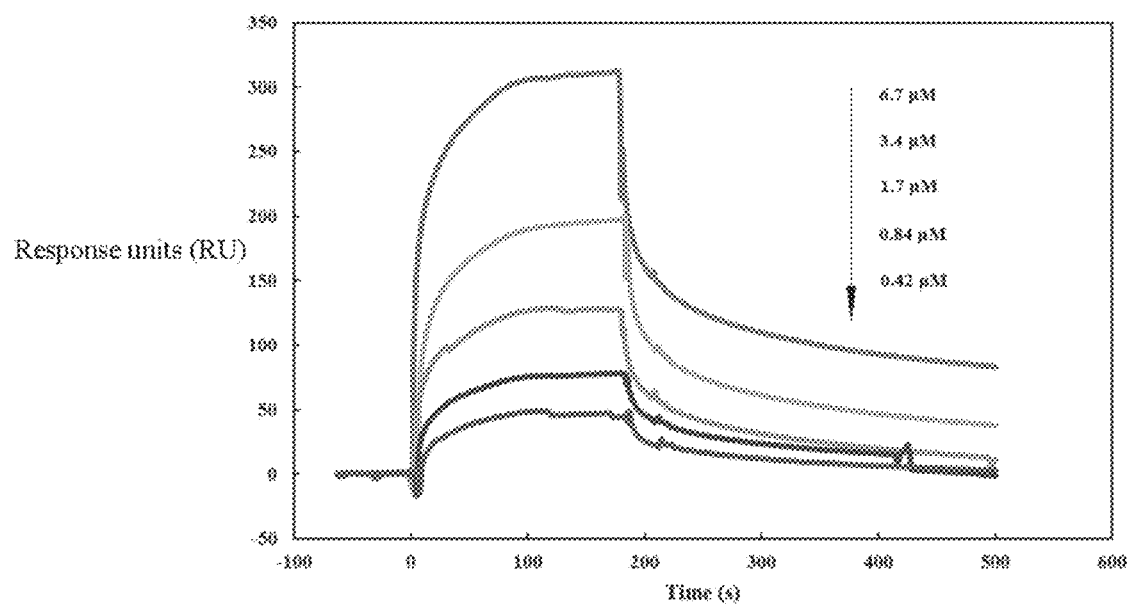
FIG. 2 is a graph showing relationships between pectic polysaccharides with different concentrations and galectin-3 in embodiment 1.

FIG. 2 is a graph showing relationships between pectic polysaccharides with different concentrations and galectin-3. As shown in the FIG. 2, a rising part on the left is a binding stage between the sample and Gal-3, and a falling part on the right is a desorption stage between the sample and Gal-3. The results show that an adsorption parameter, a desorption parameter, and a dissociation constant of the pectic polysaccharide are $1.0 \times 10^3$ (1/Ms), $3.30 \times 10^4$ (1/s) and 3.29 μM, respectively.

Comparative Case 1:

After drying and grinding citrus peel, 0.7 g citrus peel powders were mixed with 50 mmol/L sodium hydroxide solution containing 20 mmol/L sodium borohydride according to a solid-liquid ratio of 1:50 g/mL, then the obtained system was placed in a constant temperature water bath at 25° C. for performing a low-temperature alkaline extracting process, the extracting time was 90 min. The system subjected to the low-temperature alkaline extracting process was centrifuged at a speed of 6000 rpm for 20 min at room temperature, and 31 mL of supernatant was obtained after removing the residue. The supernatant was added to absolute ethanol 4 times the volume of the supernatant to precipitate the pectic polysaccharide. Further, the pectic polysaccharide was washed twice with absolute ethanol and redissolved with deionized water, the redissolved pectic polysaccharide solution was transferred to a dialysis bag with a molecular weight cut-off of 3500 Da, dialyzed in pure water for 48 h, and dried in a vacuum freezer to obtain 0.106 g of dry pectic polysaccharide powders. The yield was 20.16% calculated according to the following formula:

$$Y = \frac{m_1}{M} \times \frac{V}{V_f} \times 100\%$$

Y (%) is the yield of pectic polysaccharide, ml (g) is a mass of pectic polysaccharide, M (g) is a mass of citrus peel powders, V (mL) is a volume of ultrasonic treatment system, and Vf (mL) is a volume of supernatant after centrifugation.

The properties and structure of pectic polysaccharide were determined:

Molecular Weight

Pectic polysaccharide was dissolved in deionized water to obtain a solution with a concentration of 3 mg/mL, and the solution was injected into SEC-MALLS-RI (Wyatt Dawn Heleos-II, USA) system for detection after passing through a 0.22 μm water film. An injection volume was 50 μL, an analytical column was Shodex SB-804/806 (Showa Denko KK, Japan), a mobile phase was 0.15M sodium chloride solution, a flow rate was 0.5 mL/min, dn/dc=0.088 mL/g. A weight-average molecular weight of the pectic polysaccharide was measured to be 955 KDa, a number average molecular weight of the pectic polysaccharide was measured to be 454 KDa, and the dispersibility of the pectic polysaccharide was measured to be 2.10.

Composition of Monosaccharide

Pectic polysaccharide was dissolved in deionized water to prepare a solution with a concentration of 2 mg/mL, 1 mL of 4M tetrafluoroacetic acid was added to the solution to acquire a mixture, the mixture was hydrolyzed at 110° C. for 8 hours, then cooled to the room temperature, and 1 mL of methanol was added into the mixture, then the mixture was dried by nitrogen. 10 mL of deionized water was added into the dried product to acquire a mixture, the mixture was injected into the ICS-5000 (Thermo Fisher, USA) system for detection after passing through the 0.22 μm water membrane. The injection volume was 25 μL, the analytical column was CarboPac PA10 Analytical (Thermo Fisher, USA), the mobile phase A was 18 mM sodium hydroxide solution, and the mobile phase B was 100 mM sodium acetate solution containing 15 mM sodium hydroxide, the flow rate was 1 mL/min. In a gradient mode, the time gradient was 0 min→15 min→35 min, and the corresponding concentration gradient was 0→100% mobile phase A→100% mobile phase B.

TABLE 2

Composition of Monosaccharide of the pectic polysaccharide

| Type | Rhamnose (Rha) | Arabinose (Ara) | galactose (Gal) | Glucose (Glu) | mannose (Man) | Xylose (Xyl) | GalA (galacturonic acid) |
|---|---|---|---|---|---|---|---|
| Content (mol %) | 1.16 | 35.56 | 13.94 | 6.40 | 2.41 | 2.15 | 38.39 |

As shown in Table 1, the acidic sugar in pectic polysaccharide is mainly galacturonic acid with a content of 38.39%. A content of neutral sugar in pectic polysaccharide is relatively high, and the neutral sugar is mainly arabinose. A ratio of HG % to RG-I % in pectic polysaccharide was calculated according to the following formula. The results show that the HG mole percentage of the pectic polysaccharide manufactured by the low-temperature alkaline extracting process is 37.23%, and the mole percentage of RG-I of the pectic polysaccharide manufactured by the low-temperature alkaline extracting process is 51.82%, which indicating that the pectic polysaccharide is mainly composed of RG-I domain, a ratio of a sum of contents of arabinose and galactose to a content of the rhamnose is 42.67, indicating that the pectic polysaccharide has a higher degree of branching.

HG %=GalA %-Rha %

RG-I %=GalA %-HG %+Rha %+Gal %+Ara %

Comparative Case 2:

After drying and grinding citrus peel, 0.7 g citrus peel powders were mixed with 50 mmol/L sodium hydroxide solution containing 20 mmol/L sodium borohydride according to a solid-liquid ratio of 1:50 g/mL, then the obtained system was placed in a constant temperature water bath at 80° C. for performing a high-temperature alkaline extracting process, the extracting time was 90 min. The system subjected to the high-temperature alkaline extracting process was centrifuged at a speed of 6000 rpm for 20 min at room temperature, and 31 mL of supernatant was obtained after removing the residue. The supernatant was added to absolute ethanol 4 times the volume of the supernatant to precipitate the pectic polysaccharide. Further, the pectic polysaccharide was washed twice with absolute ethanol and redissolved with deionized water, the redissolved pectic polysaccharide solution was transferred to a dialysis bag with a molecular weight cut-off of 3500 Da, dialyzed in pure water for 48 h, and dried in a vacuum freezer to obtain 0.122 g of dry pectic polysaccharide powders. The yield was 19.67% calculated according to the following formula:

$$Y = \frac{m_1}{M} \times \frac{V}{V_f} \times 100\%$$

Y (%) is the yield of pectic polysaccharide, ml (g) is a mass of pectic polysaccharide, M (g) is a mass of citrus peel powders, V (mL) is a volume of ultrasonic treatment system, and Vf (mL) is a volume of supernatant after centrifugation.

The properties and structure of pectic polysaccharide were determined:

Molecular Weight

Pectic polysaccharide was dissolved in deionized water to obtain a solution with a concentration of 3 mg/mL, and the solution was injected into SEC-MALLS-RI (Wyatt Dawn Heleos-II, USA) system for detection after passing through a 0.22 μm water film. An injection volume was 50 μL, an analytical column was Shodex SB-804/806 (Showa Denko KK, Japan), a mobile phase was 0.15M sodium chloride solution, a flow rate was 0.5 mL/min, dn/dc=0.088 mL/g. A weight-average molecular weight of the pectic polysaccharide was measured to be 829 KDa, a number average molecular weight of the pectic polysaccharide was measured to be 383 KDa, and the dispersibility of the pectic polysaccharide was measured to be 2.16.

Composition of Monosaccharide

Pectic polysaccharide was dissolved in deionized water to prepare a solution with a concentration of 2 mg/mL, 1 mL of 4M tetrafluoroacetic acid was added to the solution to acquire a mixture, the mixture was hydrolyzed at 110° C. for 8 hours, then cooled to the room temperature, and 1 mL of methanol was added into the mixture, then the mixture was dried by nitrogen. 10 mL of deionized water was added into the dried product to acquire a mixture, the mixture was injected into the ICS-5000 (Thermo Fisher, USA) system for detection after passing through the 0.22 m water membrane. The injection volume was 25 μL, the analytical column was CarboPac PA10 Analytical (Thermo Fisher, USA), the mobile phase A was 18 mM sodium hydroxide solution, and the mobile phase B was 100 mM sodium acetate solution containing 15 mM sodium hydroxide, the flow rate was 1 mL/min. In a gradient mode, the time gradient was 0 min→15 min→35 min, and the corresponding concentration gradient was 0→100% mobile phase A→100% mobile phase B.

As shown in Table 1, the acidic sugar in pectic polysaccharide is mainly galacturonic acid with a content of 31.99%. A content of neutral sugar in pectic polysaccharide is relatively high, and the neutral sugar is mainly arabinose. HG % and RG-I % in pectic polysaccharide were calculated according to the following formula. The results show that the HG mole percentage of the pectic polysaccharide manufactured by the low-temperature alkaline extracting process is 30.38%, and the RG-I mole percentage of the pectic polysaccharide manufactured by the low-temperature alkaline extracting process is 63.27%, which indicating that the pectic polysaccharide is mainly composed of RG-I domain, a ratio of a sum of contents of arabinose and galactose to a content of the rhamnose is 37.29, indicating that the pectic polysaccharide has a higher degree of branching.

HG %=GalA %-Rha %

RG-I %=GalA %-HG %+Rha %+Gal %+Ara %

From the above embodiment one and comparative cases 1 and 2, it can be seen that the ultrasonic assisted extraction significantly reduces the extracting time and increases the extracting yield; at the same time, the molar percentage of the RG-I domain of the extracted pectic polysaccharide increases, and its functional domain is more abundant. At the same time, RG-I ratios of the pectic polysaccharide obtained by the ultrasonic assisted extracting method and the high-temperature alkaline extracting method are similar, but the ultrasonic assisted extracting method has the advantages of mild extracting conditions, energy saving, short extracting time and high extracting rate.

Embodiment 2

After drying and grinding citrus peel, 0.7 g citrus peel powders were mixed with 0.1 mol/L sodium hydroxide solution containing 50 mmol/L sodium borohydride according to a solid-liquid ratio of 1:50 g/mL, then the obtained system was placed in a constant temperature water bath of 40° C. for ultrasonic treatment. The ultrasonic treatment conditions were: ultrasonic intensity 0.5 W/mL, ultrasonic temperature 40° C., ultrasonic volume 35 mL, and ultrasonic time 40 minutes. The ultrasonic treated system was centrifuged at a speed of 6000 rpm for 30 min at room temperature, and 32 mL of supernatant was obtained after removing the residue. The supernatant was added to absolute ethanol 4 times the volume of the supernatant to precipitate the pectic polysaccharide. Further, the pectic polysaccharide was washed twice with absolute ethanol and redissolved with deionized water, the redissolved pectic polysaccharide solution was transferred to a dialysis bag with a molecular weight cut-off of 3000 Da, dialyzed in pure water for 48 h, and dried in a vacuum freezer to obtain 0.108 g of dry pectic polysaccharide powder. The yield was 16.87% calculated according to the following formula. The molecular weight

TABLE 3

Composition of Monosaccharide of the pectic polysaccharide

| Type | Rhamnose (Rha) | Arabinose (Ara) | galactose (Gal) | Glucose (Glu) | mannose (Man) | Xylose (Xyl) | GalA (galacturonic acid) |
|---|---|---|---|---|---|---|---|
| Content (mol %) | 1.61 | 41.52 | 18.53 | 2.76 | 1.02 | 2.57 | 31.99 | and the monosaccharide analysis result of the pectic polysaccharide were similar to those of the pectic polysaccharide of embodiment 1. Specifically, the weight-average molecular weight of the pectic polysaccharide was 746 KDa, the number average molecular weight of the pectic polysaccharide was 601 KDa, and the dispersibility of the pectic polysaccharide was 1.24. A ratio of a sum of contents of arabinose and galactose to a content of the rhamnose was 10.22, which indicating that the pectic polysaccharide has a higher degree of branching.

Embodiment 3

After drying and grinding citrus peel, 0.7 g citrus peel powder was mixed with 50 mmol/L potassium hydroxide solution containing 20 mmol/L sodium borohydride according to a solid-liquid ratio of 1:50 g/mL, then the obtained system was placed in a constant temperature water bath of 25° C. for ultrasonic treatment. The ultrasonic treatment conditions were: ultrasonic intensity 3.5 W/mL, ultrasonic temperature 25° C., ultrasonic volume 35 mL, and ultrasonic time 20 minutes. The ultrasonic treated system was centrifuged at a speed of 8000 rpm for 20 min at room temperature, and 31 mL of supernatant was obtained after removing the residue. The supernatant was added to absolute ethanol 4 times the volume of the supernatant to precipitate the pectic polysaccharide. Further, the pectic polysaccharide was washed three times with absolute ethanol and redissolved with deionized water, the redissolved pectic polysaccharide solution was transferred to a dialysis bag with a molecular weight cut-off of 3000 Da, dialyzed in pure water for 48 h, and dried in a vacuum freezer to obtain 0.1269 g of dry pectic polysaccharide powder. The yield is 20.47 calculated according to the following formula. The molecular weight and the monosaccharide analysis result of the pectic polysaccharide are similar to those of the pectic polysaccharide of embodiment 1. Specifically, the weight-average molecular weight of the pectic polysaccharide was 553 KDa, the number average molecular weight of the pectic polysaccharide was 310 KDa, and the dispersibility of the pectic polysaccharide was 1.78. The mol percentages of HG and RG-I of the pectic polysaccharide were 28.70% and 64.47%, respectively, which indicating that the pectic polysaccharide was mainly composed of RG-I domain. A ratio of a sum of contents of arabinose and galactose to a content of the rhamnose was 20.15, which indicating that the pectic polysaccharide has a higher degree of branching.

What is claimed is:

1. An ultrasonic-assisted method of extracting a pectin rich in RG-I, comprising:
   (1) dispersing citrus peel powders in an alkaline solution containing sodium borohydride;
   (2) placing a solution obtained in step (1) in a water bath of 25 to 40° C., and performing an ultrasonic treatment on the solution obtained in step (1);
   (3) centrifuging the solution subjected to step (2) at a speed of 6000 to 8000 rpm to remove residues, retaining a supernatant, and precipitating a pectic polysaccharide with absolute ethanol; and
   (4) adding water to the pectic polysaccharide precipitant subjected to step (3) to obtain a redissolved solution, transferring the solution to a dialysis bag with a molecular weight cut-off of 3000 to 3500 Da, dialyzing for 48 hours, and freeze-drying in a vacuum freezer to obtain the pectin rich in RG-I.

2. The ultrasonic-assisted method of extracting a pectin rich in RG-I according to claim 1, wherein, in step (1), the citrus peel powders are mixed with the alkaline solution according to a solid-liquid ratio of 1:50 g/mL, and an alkali in the alkaline solution is sodium hydroxide or potassium hydroxide with a concentration of 0.05 to 0.1 mol/L, and a concentration of sodium borohydride is 20 to 50 mmol/L.

3. The ultrasonic-assisted method of extracting a pectin rich in RG-1 according to claim 1, wherein in step (2), an ultrasonic time is 20 to 40 min, and an ultrasonic intensity is 0.5 to 3.5 W/mL.

4. The ultrasonic-assisted method of extracting a pectin rich in RG-I according to claim 1, wherein a centrifuging time in step (3) is 20 to 30 min.

5. The ultrasonic-assisted method of extracting a pectin rich in RG-I according to claim 1, wherein the pectic polysaccharide precipitant in step (4) is washed with absolute ethanol for 2 to 3 times.

* * * * *